Figure 1:
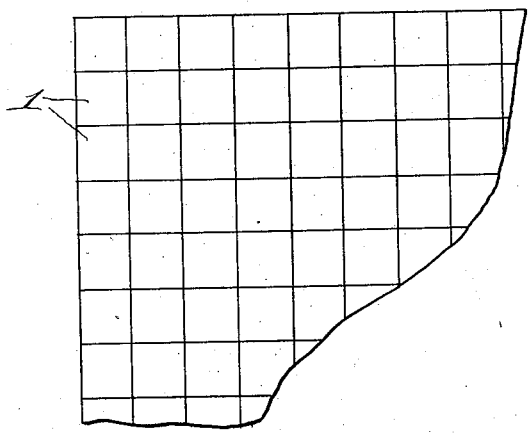

April 9, 1940.  A. ELMENDORF  2,196,387

FLOORING MATERIAL AND FLOOR

Filed Oct. 29, 1937

Inventor:
Armin Elmendorf,
By Wm. F. Freudenreich,
Atty.

Patented Apr. 9, 1940

2,196,387

UNITED STATES PATENT OFFICE 2,196,387

FLOORING MATERIAL AND FLOOR

Armin Elmendorf, Winnetka, Ill.

Application October 29, 1937, Serial No. 171,691

1 Claim. (Cl. 20—7)

A type of flooring possessing many desirable and useful characteristics is that comprising a wearing layer of wood tiles backed with a flexible membrane which, in turn, is adapted to be cemented to a subfloor or foundation. Roofing and building felts, among other fabricated sheets, can be employed as the backing membranes. It is desirable that the backing membranes be strong and, also, that there be a waterproof barrier between the wood and the supporting foundation. Both of these ends can be attained through the use of membranes that are impervious to or which can only slowly absorb water or water vapor; as, for example, so-called saturated felts, such as building or roofing felts so thoroughly impregnated with asphalt or other bituminous material as to comprise, in effect, sheets of bituminous material having reenforcing fibers embedded therein.

In order to keep down the cost, an inexpensive cement or adhesive should be used to bond the flooring to a subfloor, an old floor that is to be covered up, or other foundation. Adhesives of the water-soluble and alcohol-soluble types as, for example, those by which linoleum is commonly fastened down, are suitable for my purpose when permitted to set under proper conditions.

One purpose in having a waterproof backing for the tiles is to prevent cupping or warping of the tiles through rapid absorption of large quantities of vapor from the considerable mass of adhesive that must be spread over a rough or uneven foundation before the flexible tile flooring is laid upon the same.

There often arises a serious difficulty when flooring of the aforesaid type is bonded to a concrete floor or to a painted or varnished wood floor with a water-soluble or an alcohol-soluble adhesive. In such cases, where the backing membrane of the flooring is substantially impervious to vapors evolved from the adhesive, as in the case of the saturated felt type, the pores of which are completely filled with asphalt or the like, the water or alcohol in the adhesive cannot evaporate and permit the adhesive to set, except very slowly; wherefore a flooring may be in use for a considerable length of time before the adhesive has set. If, before the adhesive has set, the hygroscopic moisture of the wood tiles increases sufficiently through absorption of moisture from the atmosphere, the tiles expand and, if the layer of tiles is constrained in the lateral directions, the flooring tends to bulge upward.

If at this time the adhesive is still soft, the bond between the backing membrane and the foundation is ruptured by the upward movements of sections of the flooring and remains thus.

The object of the present invention is to produce a simple and novel floor construction, including a flooring comprising wood tiles having or mounted on a flexible backing membrane, which shall overcome the difficulty just described, while providing the desirable strong backing and waterproof barrier between the wood tiles and the foundation on which the flooring rests in its position of use.

According to one method of carrying out my invention, I build a flooring material from wood tiles in the form of blocks or boards mounted side by side on a flexible backing membrane substantially impervious to liquids or to water vapor or alcohol vapor. The backing membrane may be felt or other porous fibrous sheet material saturated with asphalt or other bituminous material or may be metal foil or a thin layer of rubber latex or the like. If the tiles are bonded to such a membrane with a water-soluble or alcohol-soluble adhesive, the liquid can evaporate quickly because the wood absorbs the vapors. However, the adhesive need be spread in only a very thin layer so that there will be little, if any, warping of the wood; or, if warping occurs, the completed flooring need only be seasoned until the distribution of moisture in the tiles becomes equalized and the tiles again become flat.

Before such a flooring is laid on a foundation such as concrete which will not readily absorb vapors from adhesives spread upon the same, there is bonded to the latter a layer or membrane having the capacity readily to absorb vapors as, for example, unsaturated or porous felt. This layer or membrane makes it possible for the moisture in the adhesive between the same and the foundation to set in a satisfactory manner; and, when it, in turn, is coated with adhesive and the flexible flooring is laid upon the same, it absorbs the water vapor which cannot escape from the adhesive into the saturated backing membrane to which the tiles are attached. It therefore follows that the solvent in the adhesive material is not imprisoned within either adhesive layer, and both layers of adhesive become effective bonds.

It is evident that both membranes may be applied as a compound or multiple-ply backing for the tiles and the whole be laid as a unit upon a floor or other foundation. Therefore, viewed in one of its aspects, the present invention may be said to have for its object to produce a simple and novel flooring material comprising a layer of wood tiles and a flexible backing which prevents water from passing upwardly through the same to the tiles, while having the capacity to absorb vapors from the water or alcohol consituting the solvent for an adhesive interposed between the flooring and an impervious sub-floor or foundation.

Figure 2:
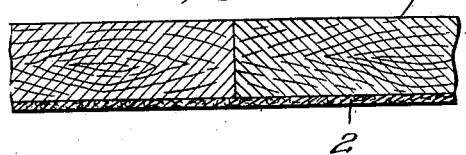
Figure 3:
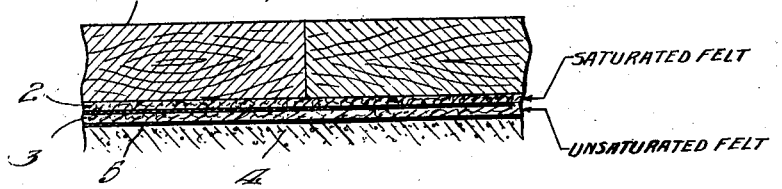

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a plan view of a fragment of a floor embodying the present invention; Fig. 2 is a vertical section, on a much larger scale, through a flexible sheet consisting of a wood layer and a backing membrane on which the wood is mounted; and Fig. 3 is a vertical section through a concrete or other subfloor overlaid with my improved flooring, including an absorbent layer underneath the flexible sheet shown in Fig. 2.

Referring to Figs. 1 and 2 of the drawing, 1, 1 represent wood tiles which may be in the form of blocks, short boards or narrow strips secured to a suitable backing membrane 2 by means of adhesive, staples or other fastening means. This constitutes one form of my flooring. The backing membrane may be metal foil, a layer of rubber or the like, or felt or other fibrous material thoroughly saturated in a waterproofing substance, preferably asphalt or other bituminous material, so as to be substantially impervious to water vapor and alcohol vapor. The tiles may conveniently be bonded to the backing membrane with any suitable adhesive, if desired, because such a small amount of adhesive is needed for this purpose that the effect of the moisture therein on the wood tiles is negligible, as heretofore explained.

In order to prepare a concrete subfloor 4 or any subfloor that has been treated or coated so that it will not readily absorb moisture or water vapor or alcohol vapor, there is laid upon and bonded to the latter a layer 3 which is absorbent and need not be waterproofed; although, if desired, the individual fibers of the layer may be waterproofed, as long as the interstices or pores between fibers remain open. Before putting down the layer 3, the subfloor is covered with a comparatively heavy coating 5 of wet adhesive. Because of the absorbent character of the layer 3, moisture is quickly taken up by the same from the adhesive, and the adhesive is thus able to set promptly.

After the absorbent layer 3 has been laid it is, in turn, coated with adhesive material and is now ready to receive the flexible flooring. When the absorbent layer 3 is sufficiently thick, it is capable of taking up the necessary moisture from the adhesive on both faces thereof, so as to make it unnecessary to delay the laying of the flexible flooring until the adhesive between the subfloor and the absorbent layer has set.

It will, of course, be understood that the flooring, as manufactured, may include the absorbent layer 3, so that only one bonding step is required to attach the flooring to the subfloor. Where the floor itself contains both the impervious membrane and the absorbent layer, the component parts may be fastened together in any suitable way even without the employment of adhesives, since the wood tiles may be fastened to the composite backing by staples or other mechanical fastenings. However, it is preferable that the absorbent layer be bonded to the impervious membrane.

The adhesive which is employed to secure the absorbent layer to the subfloor or the impervious membrane to the absorbent layer may be of any of the types commonly employed to fasten down linoleum, or other water solution or alcohol soluble adhesives or adhesives containing water or alcohol. Latex adhesives, for example, contain a large proportion of water and are suitable for my purpose.

While I have illustrated and described with particularity only a single preferred form of my invention, with a few slight modifications, I do not desire to be limited to the exact structural details thus illustrated and described; but intend to cover all forms and arrangements which come within the definitions of my invention constituting the appended claim.

I claim:

In combination, a subfloor not readily permeable by water or water vapor, of a flexible layer of material capable of absorbing water and alcohol bonded directly to said floor with an adhesive containing water or alcohol and sufficiently thick to absorb the vapors from a comparatively thick layer of adhesive, a non-plastic membrane relatively impervious to water and alcohol overlying and bonded directly to the first layer, and a layer of wood tiles overlying and secured directly to said membrane.

ARMIN ELMENDORF.